United States Patent [19]

Defauchy et al.

[11] 4,032,399

[45] June 28, 1977

[54] INTEGRATED FAST REACTOR OF THE LIQUID METAL COOLED TYPE

[75] Inventors: Jean Defauchy, St-Michel-sur-Orge; Claude Malaval, Antony, both of France

[73] Assignee: Commissariat a l'Energie Atomique, Paris, France

[22] Filed: Nov. 13, 1975

[21] Appl. No.: 631,601

[30] Foreign Application Priority Data

Nov. 14, 1974   France ................................. 74.37575

[52] U.S. Cl. ................................. 176/62; 176/40; 176/65; 176/87
[51] Int. Cl.² ................................. G21C 15/02
[58] Field of Search ............... 176/40, 51, 52, 61, 176/62, 63, 65, 87

[56] References Cited

UNITED STATES PATENTS

| | | | |
|---|---|---|---|
| 2,852,456 | 9/1958 | Wade | 176/18 |
| 3,161,570 | 12/1964 | Hammond et al. | 176/40 |
| 3,322,643 | 5/1967 | Sprague et al. | 176/61 |
| 3,498,880 | 3/1970 | Gollion | 176/65 |
| 3,784,443 | 1/1974 | Vercasson | 176/40 |
| 3,932,214 | 11/1976 | Aubert et al. | 176/87 |

Primary Examiner—Stephen C. Bentley
Assistant Examiner—S. A. Cangialosi
Attorney, Agent, or Firm—Cameron, Kerkam, Sutton, Stowell & Stowell

[57] ABSTRACT

A cooling circuit for the main reactor vessel is limited on one side by the main vessel and a flow-reversing baffle shell and on the other side by the flow-reversing baffle shell and a counter-baffle shell which surrounds the primary vessel. The cooling circuit is supplied with a fraction of the cold liquid metal which is present within an intervessel space between the counter-baffle shell and the primary vessel. An annular chamber is located above the cold liquid metal and filled with an inert gas at a pressure which maintains the gas/liquid metal interface below the top of the flow-reversing baffle shell.

6 Claims, 6 Drawing Figures

INTEGRATED FAST REACTOR OF THE LIQUID METAL COOLED TYPE

This invention relates to an integrated fast reactor which is cooled by a liquid metal.

In more exact terms, the present invention is concerned with a nuclear reactor of the type just mentioned in which special and novel arrangements are proposed for ensuring thermal protection of the main reactor vessel wall and more particularly the top portion of this latter.

It is known that a nuclear reactor is of the so-called integrated type when the entire primary coolant circuit is located within the interior of the main vessel.

In order to gain an understanding of the problem solved by the present invention, reference will be made successively to FIGS. 1 and 2 which illustrate the prior art. The main vessel of an integrated fast reactor is shown diagrammatically in the transverse sectional view of FIG. 1 whilst FIG. 2 shows more precisely the particular arrangements employed in accordance with known practice for the thermal protection of said main vessel which it is found necessary to improve.

In FIG. 1, there is shown the concrete containment vault 2 closed by the containment vault roof 4 in which are arranged rotating shield plugs such as the plug 6.

The main reactor vessel delimited by the shell 8 which is suspended from the vault roof 4 contains the reactor core 10 and the entire primary circuit for the liquid metal coolant together with its heat exchangers as designated by the reference 12 and its primary circulating pumps as designated by the reference 16. Provision is made in the top portion of the shell or main vessel 8 for a blanket 18 of inert gas under pressure. The reactor core 10 is constituted by fuel assemblies, the lower ends of which are inserted in the diagrid 20. Said diagrid rests on a support structure 22 which is in turn carried by the shell 8 of the main vessel.

Inside the main vessel, the liquid metal is divided into two zones by the shell 24 which is provided with an extension by means of the frusto-conical shell 26.

The two shells 24 and 26 aforesaid constitute the primary vessel 25. The internal within 28 witin the primary vessel 25 contains hot liquid metal whilst the external zone limited on one side by said primary vessel and on the other side by the shell 8 of the main vessel and the diagrid support structure 22 constitutes the intervessel space 30 and contains cold liquid metal.

The liquid metal flows upwards through the core assemblies 10, is discharged in the hot state into the primary vessel 25, then passes through the heat exchangers such as the exchanger 12, the cold liquid metal being then discharged from these latter into the intervessel space 30, drawn from said space by the primary pumps 16 and discharged into the diagrid 20 via the duct 32.

The main vessel 8 which supports the entire assembly is subjected to very high thermal gradients since the cold liquid metal has a temperature of the order of 400° C at the reactor core inlet whereas the hot liquid metal has a temperature of the order of 560° C after it has passed through the reactor core.

The main vessel 8 is cooled in known manner by employing a fraction of the cold sodium which is discharged into the diagrid 20, said fraction being constituted by the leakages from the structure 22 which supports the reactor core 10, and which is admitted at E into a space formed between said main vessel 8 and a first shell 34.

As shown in FIG. 2, the flow fraction aforesaid is directed along the wall of the main vessel 8 by means of the first shell 34 known as a flow-reversing baffle-plate. The free upper extremity 36 of said baffle-plate or so-called point of reversal is located in the coolant metal and the lower extremity is connected to the diagrid support structure 22. After reversal at 36 as indicated by the arrow F, said flow of liquid metal coolant returns downwards into the intervessel space 30 by means of a second shell 38 known as a counter-baffle. The annular space formed between the counter-baffle 38 and the primary vessel 25 which provides a separation between the cold metal and the hot metal corresponds to the top portion of the intervessel space 30 and contains cold liquid metal.

During normal reactor operation, the level 42 of the liquid metal coolant between the main vessel 8 and the counter-baffle 38 is the same as the level 44 within the primary vessel 25. In particular, said level 42 is located above the point of reversal 36 of the coolant metal, thus constituting a ring of stagnant liquid metal above said point 36. Moreover, the level 46 within the annular space formed between the counter-baffle 38 and the primary vessel 25 is established at a height which varies as a function of the pressure drop introduced on the one hand by the heat exchangers 12 and on the other hand by a diaphragm 33 located within the space formed between the flow-reversing baffle-plate 34 and the counter-baffle 38. When said level 46 is below the level 42, the heat generated by the hot metal of the primary vessel 25 cannot flow directly towards the main vessel 8 since a layer of inert gas is then present between the hot metal and the liquid metal coolant within the annular space located between the counter-baffle 38 and the primary vessel 25, said inert gas layer being derived from the blanket 18 and having a relatively heat-insulating capacity in comparison with the liquid metal. Unfortunately, there are certain operating regimes of the reactor at which the level 46 is established above the point of reversal 36, thus producing a veritable thermal short-circuit between on the one hand the hot metal of the primary vessel 25 and on the other hand the cooling space located between the counter-baffle 38 and the vessel 8.

In order to overcome this major disadvantage to a partial extent, it has already been proposed (U.S. Patent Application Ser. No. 513.817 filed Oct. 10, 1974 for LIQUID SODIUM COOLED FAST REACTOR, now abandoned) to prevent the liquid metal from lying stagnant above the flow-reversing baffle-plate 38 by means of a siphon arrangement of the shells which constitute the cooling circuit.

However, the efficiency of this system is dependent on the sodium flow velocity induced within said siphon since the conduction of lateral heat from the center of the vessel to the exterior is not eliminated. Moreover, in a solution of this type, it is not possible to prevent heat build-up in the event of stoppage of the cooling circuit along the main vessel.

The present invention is precisely directed to a reactor which embodies novel, simple and effective arrangements for thermal protection of the main vessel of said reactor with thermal insulation of the stagnant sodium layer which overcomes the disadvantages mentioned in the foregoing.

Said nuclear reactor essentially comprises a main vessel and within said main vessel a reactor core constituted by fuel assemblies resting on a support structure, said reactor core being cooled by a liquid metal which flows upwards through the fuel assemblies of said core prior to introduction into primary heat exchangers from which the cold liquid metal is discharged into a bottom zone of the main reactor vessel or so-called intervessel space which is separated from the zone containing the hot metal by the primary vessel, said cold liquid metal being withdrawn from the intervessel space in order to be reinjected under pressure by means of pumps into the lower portion of the reactor core fuel assemblies. The reactor essentially comprises a circuit for cooling said main vessel and supplied with a fraction of the cold metal which is injected into the lower ends of the reactor core fuel assemblies, said cooling circuit being delimited on one side by the main vessel and a first shell or flow-reversing baffle-plate and on the other side at the top portion of said main vessel by said flow-reversing baffle-plate and a second shell or counter-baffle which surrounds the primary vessel. The cold liquid metal which is present between the second shell and the primary vessel is surmounted at least partially by an annular chamber filled with an inert gas at a pressure such that the gas/liquid metal interface within said chamber is located below the top of said flow-reversing baffle-plate.

By permitting the interposition of a layer of inert gas having lower heat conductivity than the liquid metal between said hot metal and the vessel cooling metal, the novel arrangements of the invention afford satisfactory thermal protection of said vessel irrespective of the operating regime of the reactor.

The level of the gas/liquid metal interface of the trapped gas may nevertheless undergo certain displacements at a given power level of the reactor. In fact, the oscillating mass of gas which has thus been trapped in accordance with the essential feature of the invention between the counter-baffle and the primary vessel forming a separation between the cold liquid metal and the hot liquid metal is liable to vary according to the temperatures of the metal and of the gas at different operating regimes of the reactor.

In any case, whatever may be the cause of variations of the gas/liquid metal interface of the gas layer, it is essential in accordance with the invention to provide the possibility of maintaining its level below the top of the flow-reversing baffle-plate.

To this end, three alternative embodiments of the reactor in accordance with the invention make it possible to change the bottom level of the gas layer to a desired value for a given operating regime of the reactor by adding to the top portion of the annular chamber in which said gas layer is trapped either manual control means such as pipes fitted with valves or automatic means such as dip tubes of suitable length which can be replaced by an additional shell in the third alternative embodiment.

In order that the invention may be more readily understood, the following description relates to examples of application of the system according to the invention, said examples being given without any implied limitation and reference being made to FIGS. 1 and 2 showing the prior art and to the diagrammatic FIGS. 3, 4, and 5 of the accompanying drawings in which:

FIGS. 3A, and 3B are vertical sectional views showing the arrangements of the invention which are intended to ensure thermal protection of the main reactor vessel in accordance with a first alternative embodiment in which the annular chamber is formed by joining the counter-baffle and the primary vessel together in rigidly fixed relation;

Figure 1:
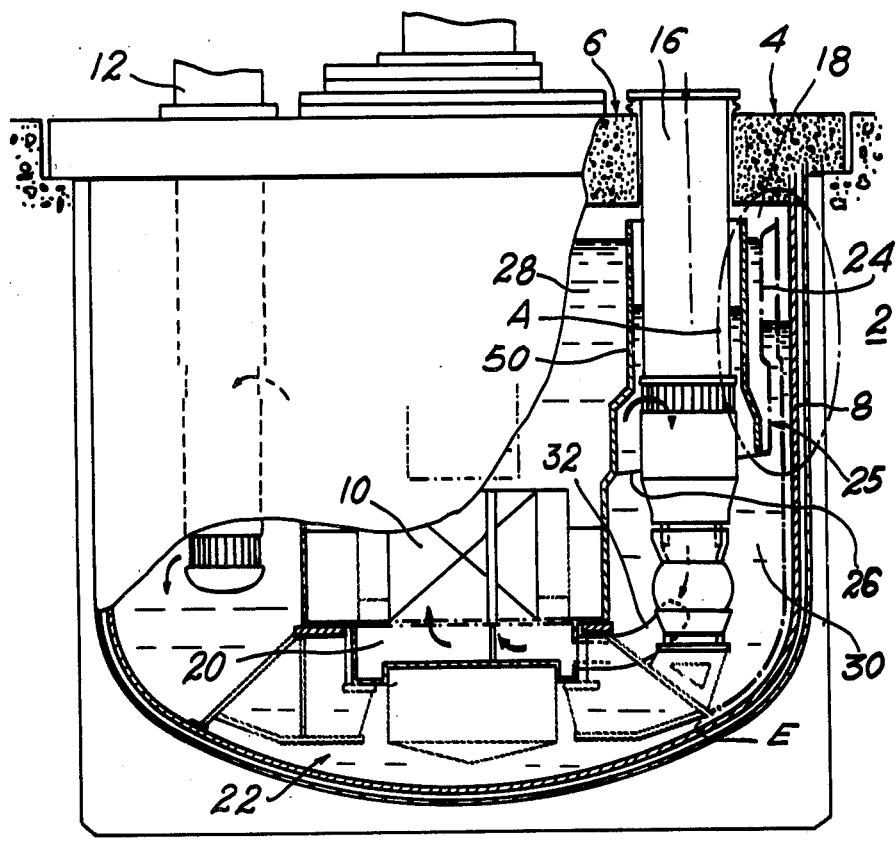
Figure 2:
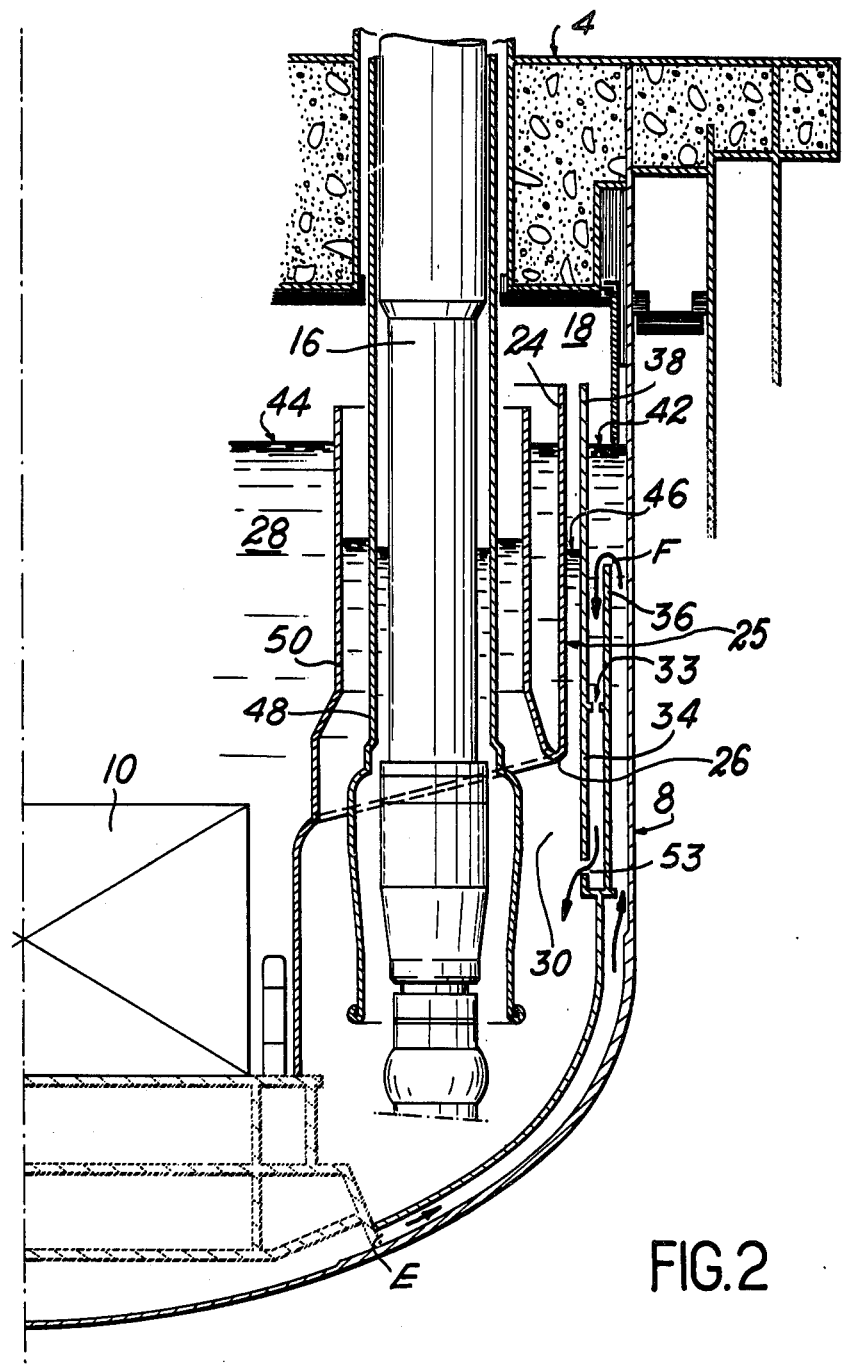
Figure 3A:
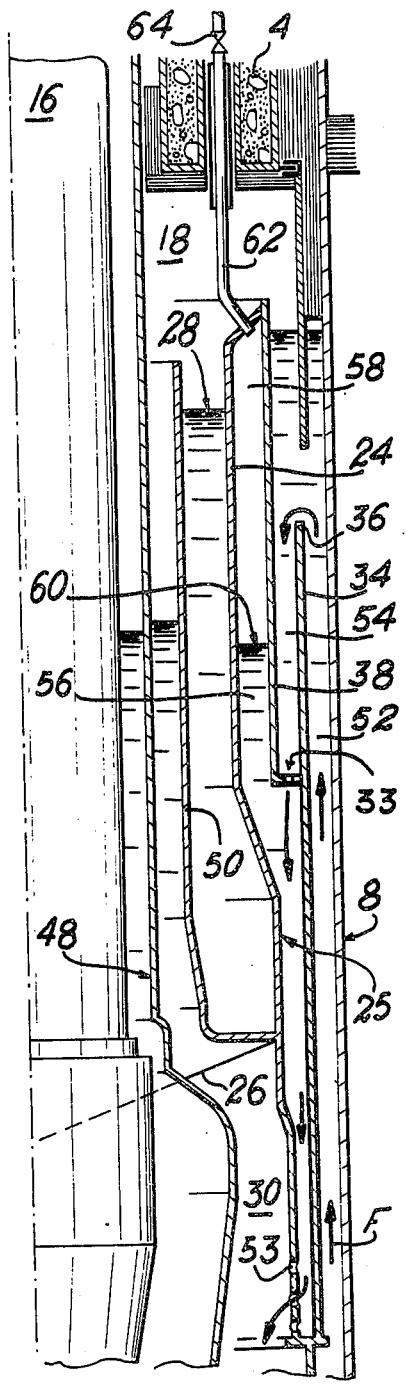

There is shown in diagrammatical cross-section in FIG. 3A a partial view of the main vessel of a fast reactor corresponding to the portion A of FIG. 1.

There can be seen in this figure the containment vault roof 4 from which the main vessel 8 is suspended, the primary pump 16 being located within said vessel and provided with a skirt 48, the upper portion of which is located within the primary vessel 25 whilst the lower portion located within the intervessel space 30 passes through the frusto-conical shell 26. The upper portion of said pump 16 is contained within a chimney 50, the base of which is attached to the frusto-conical shell 26.

It will be recalled that the liquid metal which is the most advantageous for this type of integrated fast reactor is liquid sodium.

The sodium circuit for cooling the main vessel 8 comprises the passage 52 located between the main vessel 8 and the flow-reversing baffle-plate 34 for the upward flow of the cold sodium produced by leakages from the core support structure, and the passage 54 located between the first shell or flow-reversing baffle-plate 34 and the second shell or counter-baffle 38 through which said cold sodium is returned downwards. Within said cooling circuit, a diaphragm 33 is placed between the flow-reversing baffle-plate 34 and the counter-baffle 38. The extension of the shell 24 within the intervessel space 30 beneath the frusto-conical shell 26 is provided with orifices 53 for discharging the cold sodium coolant into the intervessel space 30 at a point located distinctly below said frusto-conical shell 26.

In accordance with the essential feature of this alternative embodiment, the space 56 which contains cold sodium and forms a separation between the hot sodium of the primary vessel 25 and the cold sodium of the cooling circuit is closed at the top by virtue of the fact that the counter-baffle 38 and the primary vessel 25 are joined together at their upper extremities. This connection is made so as to form a leak-tight annular chamber 58 in conjunction with the free surface of the cold sodium of the space 56.

There is trapped within said chamber a mass of inert gas having low heat conductivity such as argon for example, at a temperature and pressure such that the interface 60 between gas and cold sodium is located irrespective of the operating regime of the reactor at a lower level than that of the point of reversal 36 of the sodium coolant circuit.

A certain number of openings are formed at the top of the annular chamber 58 for the introduction of a certain number of pipes such as the pipe 62 which open into a common external manifold. Each pipe aforesaid is fitted with a valve 64 for controlling and adjusting the gas pressure.

Thermal protection of the reactor vessel 8 by means of the arrangements provided by the invention is ensured as follows:

At the moment of startup, a certain mass of gas is trapped within the annular chamber 58, the initial temperature and pressure of said gas being suitably determined. After trapping of said mass of gas and when the reactor undergoes a change in reactivity, the level of the interface 60 between gas and cold sodium is simultaneously conditioned by the new value of the pressure drops produced by the heat exchangers 12 and by the new range of temperature and pressure acquired by the mass of trapped gas.

Thus, by making a suitable choice of the initial parameters of temperature and pressure of the mass of trapped gas, it is possible at the time of reactor operation to obtain oscillations of the interface 60 between gas and cold sodium which are always located below the point of reversal 36. Accordingly, the coolant sodium which lies stagnant above said point of reversal 36 is thermally insulated from the hot sodium in respect of all operating regimes since the trapped layer of gas is always interposed between the hot sodium and the coolant sodium up to a sufficient height.

A judicious plan, for example, consists in establishing the initial temperature and pressure of the mass of gas to be trapped at values equal to those prevailing within the inert gas blanket 18 located above the hot sodium of the main vessel at the time of one of the operating regimes of the reactor which is taken as a reference regime. when taking the fuel-handling regime of the reactor as a reference state, for example, it is found that the displacements of the gas-sodium interface 60 obtained are satisfactory.

When the level of the interface between gas and cold sodium is displaced as a result of accessory phenomena in any one operating regime of the reactor, it is advisable to employ the valves 64 fitted in the pipes 62 which are connected to the annular chamber as described in the foregoing. Said valves serve to restore the level of the interface 60 between gas and cold sodium to its intended value in respect of a given operating regime by correcting the pressure of the trapped mass of gas.

Predictable accessory phenomena can consist in a certain degree of degassing of the sodium located beneath the annular chamber or in dissolution of a certain quantity of the trapped inert gas by said sodium. The above-mentioned valves also serve to overcome any possible variations in pressure of the blanket gas 18 which would have an influence on the position of the interface 60.

Figure 3B:
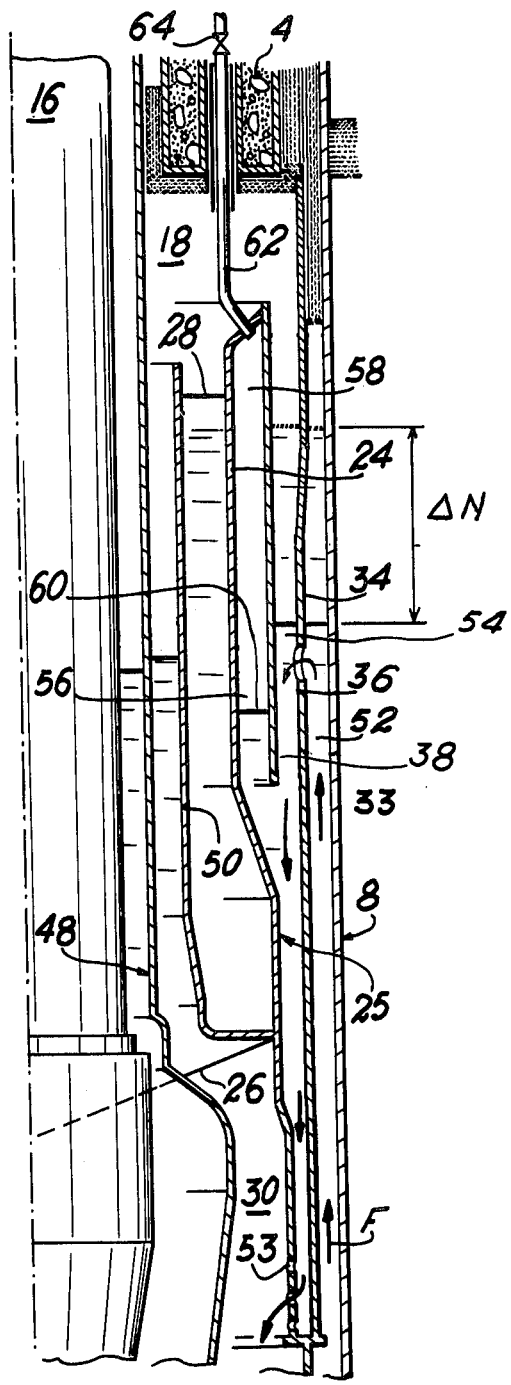

In FIG. 3B, the parts already shown in FIG. 3A are designated by the same reference numerals; there is again shown the leak-tight annular chamber 58 which is formed by joining the counter-baffle 38 to the primary vessel 25 and into which open pipes such as the pipe 62.

It is apparent from this figure that the vessel cooling circuit is no longer provided with a diaphragm between the flow-reversing baffle-plate 34 and the counter-baffle 38.

In the case of a reactor in which the main vessel 8 is protected by means of the arrangements according to the invention, it is apparent that, at the time of an increase in the output of the pumps, the elimination of the diaphragm results in a marked reduction of the level 42 of liquid metal along the main vessel 8.

Said reduction in level as represented in FIG. 3B by $\Delta N$ is advantageous since it plays a contributory part in improving the distribution of temperatures along the vessel.

It is worthy of note that, after one of the operating regimes of the reactor has been judiciously chosen for the purpose of establishing the parameters of initial temperature and pressure of the mass of gas, it is also possible to trap a predetermined mass of gas such that, at another operating regime, the level of the gas-sodium interface 60 is precisely that which would be established with a direct communication at said regime between the gas of the annular chamber 58 and the gas which constitutes the blanket 18, that is, without trapping of gas within said chamber 58 as in the prior art.

Figure 4:
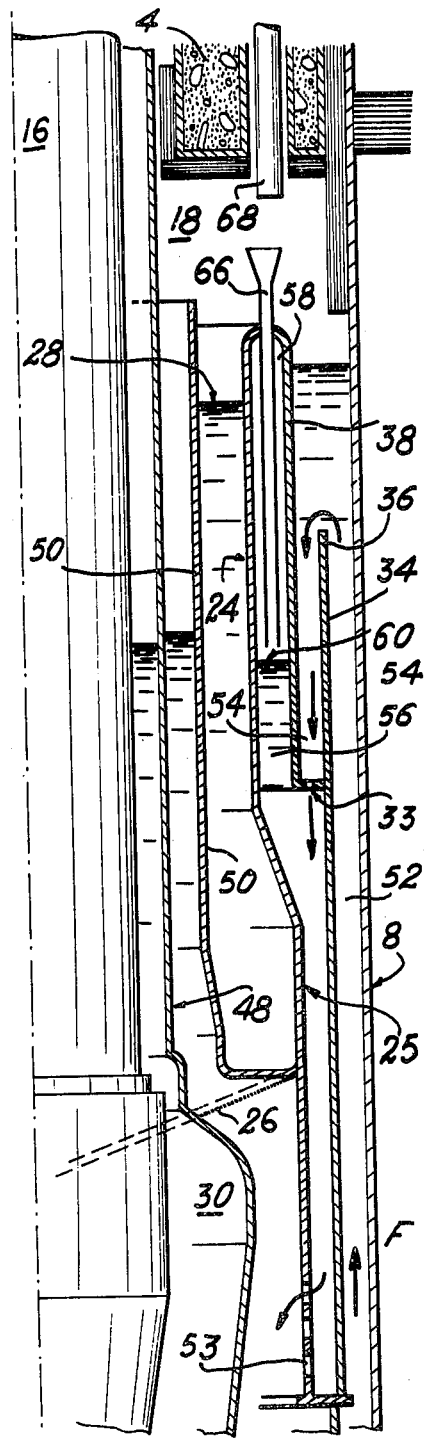
FIG. 4 is another vertical sectional view showing the arrangements according to the invention in a second preferential alternative embodiment.
Figure 5:
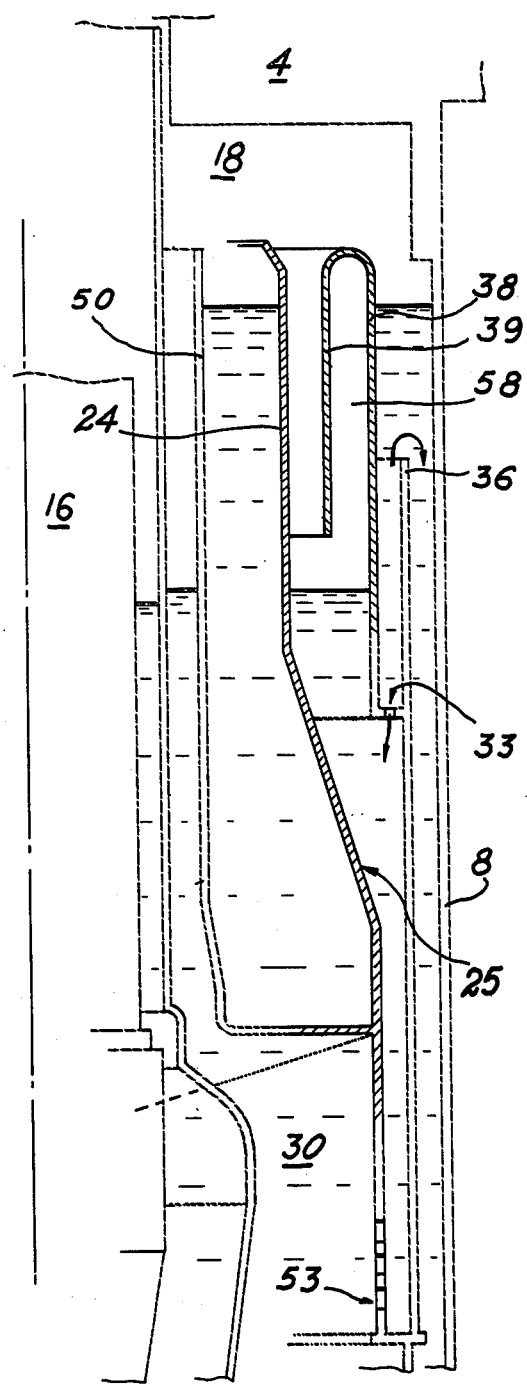
FIG. 5 is a further vertical sectional view showing the arrangements according to the invention in a third preferential alternative embodiment in which the annular chamber is separated from the primary vessel by an additional shell.

This observation forms a conceptual basis for the second and third alternative embodiments of the invention which are shown in FIGS. 4 and 5.

In FIG. 4 which illustrates the second alternative embodiment, the parts which have already been illustrated in FIG. 3 are clearly designated by the same reference numerals.

It is apparent that no change has been made in the arrangement of the shells which constitute the general thermal protection system in order to delimit the annular chamber.

In accordance with the essential feature of this alternative embodiment, so-called dip tubes such as the tube 66 are disposed in the upper portion of the annular chamber 58. These vertical dip tubes are open at both ends; the top end opens into the blanket 18 and the bottom end opens into the annular chamber 58. The lengths of said tubes are such that the bottom ends are located above the sodium-gas interface 60 at the two operating regimes at which the annular chamber is intended to be in communication with the blanket gas. Openings are also provided in the containment vault roof 4 so as to place a certain number of vertical tubes such as the tube 68 above each of the dip tubes 66, the axis of each tube 68 being displaced with respect to the axis of each dip tube 66.

Thermal protection of the vessel 8 is ensured in the same manner as with the arrangements shown diagrammatically in FIGS. 3A and 3B. In fact, thermal insulation of the sodium which lies stagnant above the flow-reversing baffle-plate is carried out in the same manner by trapping a mass of gas under conditions such that the oscillations of the sodium-gas interface always take place below the point of reversal 36.

In this alternative embodiment, however, control of any displacements of the interface 60 is no longer carried out from the exterior of the reactor and manually by means of valves 64 since it is performed automatically in respect of two of the operating regimes of the reactor by means of the dip tubes 66. In fact, at these regimes and in the case of a predetermined mass of gas and a suitable length of the tubes 66, the bottom ends of these tubes no longer penetrate into the sodium of the space 56. Thus the communication established by means of said tubes between the gas of the annular chamber 58 and the gas of the blanket 18 serves to restore within the annular chamber the pressure which is intended to prevail therein in order to obtain the predetermined level of the gas-sodium interface 60, that is, the pressure of the blanket gas 18 for the operating regime at which the dip tube is intended to establish a communication.

The tubes 68 are designed to clean out the dip tubes 66 which are liable to become clogged in the event of a fault condition. It is thus possible by means of this alternative embodiment to obtain effective protection of the main vessel throughout the period of reactor operation since the levels of the cold sodium of the interface 60 always return to the same position irrespective of the extent of variations in pressure of the blanket gas 18, this position being below the level of the extremity of the flow-reversing baffle-plate 36.

In the third alternative embodiment shown in FIG. 5, it is apparent that the annular chamber 58 is no longer formed by joining the top portions of the counter-baffle 38 to the primary vessel 25 in leak-tight manner. In accordance with the essential feature of this preferential embodiment, the annular chamber 58 is formed by means of an additional shell 39 which is joined at the top to the counter-baffle 38 and free at the lower end. Said free lower end of the additional shell 39 is located at the same level as the ends of the dip tubes 66 employed in the alternative embodiment shown in FIG. 4 in the case of the two operating regimes at which the annular chamber 58 is intended to communicate with the blanket gas 18.

In this alternative embodiment, thermal insulation is still obtained by trapping a mass of gas under suitable conditions; but in this case said mass of gas is trapped within a chamber 58 whose opposite faces are not at temperatures which are too different since said chamber 58 is separated from the primary vessel 25.

In the case of this alternative embodiment, control of the displacements of the interface 60 is carried out automatically by establishing a communication between the chamber 58 and the blanket gas by means of the annular space formed between the additional shell 39 and the primary vessel 25 when the level of the interface 60 is below the free bottom end of the additional shell 39 at certain operating regimes of the reactor.

What we claim is:

1. A nuclear reactor comprising a main vessel, a reactor core within said main vessel, fuel assemblies in said core, a support structure in said main vessel supporting said fuel assemblies, a liquid metal coolant in said core which flows upwardly through said fuel assemblies and exiting said core as hot metal coolant, primary heat exchangers in said main vessel receiving said hot coolant from said core, cold liquid metal coolant exiting from said heat exchanges into an intervessel space in a bottom zone of said main vessel, a primary enclosing said vessel core and separating said intervessel space from the zone containing said hot metal coolant, pumps in said intervessel space withdrawing said cold liquid metal from said intervessel space and reinjecting said cold liquid metal under pressure into a lower portion of said fuel assemblies, a circuit for cooling said main vessel supplied with a fraction of said cold liquid metal, said coolant circuit including on one side said main vessel and a flow reversing baffle plate, said flow reversing baffle plate comprising a first shell within said main vessel said coolant circuit including on the other side at the top portion of said main vessel said flow reversing baffle plate and a counter baffle, said counter baffle comprising a second shell which surrounds said primary vessel, said first shell surrounding said second shell, an annular chamber above said cold liquid metal between said second shell and said primary vessel and an inert gas in said annular chamber forming a gas/liquid metal interface chamber at a pressure such that the gas/liquid metal interface within said chamber is located below the top of said flow reversin baffle plate.

2. A nuclear reactor according to claim 1, wherein said annular chamber is delimited by the second shell and the primary vessel which are joined together at the top portions thereof.

3. A nuclear reactor according to claim 1, wherein the inert gas is argon.

4. A nuclear reactor according to claim 2, wherein said annular chamber at the top portion thereof includes a plurality of openings, pipes in said openings, valves in said pipes and a common manifold outside said reactor, said pipes opening into said manifold.

5. A nuclear reactor according to claim 2, wherein said annular chamber at the top portion thereof includes a plurality of openings, vertical dip tubes in said openings, said tubes being open at both ends and having a length such that the lower ends thereof are at a higher level than the gas/liquid metal interface for at least one given operating regime of the reactor.

6. A nuclear reactor according to claim 1, including an additional shell separating said annular chamber from the primary vessel, said additional shell being joined at its top portion thereof to said counter baffle and having a free bottom edge located at a higher level than the gas/liquid metal interface for at least one given operating regime of the reactor.

* * * * *